(12) United States Patent
Gordon et al.

(10) Patent No.: US 9,664,542 B2
(45) Date of Patent: May 30, 2017

(54) SYSTEMS AND METHODS FOR ADDITIVE MANUFACTURING FOR AIR DATA PROBES

(71) Applicant: Honeywell International Inc., Morristown, NJ (US)

(72) Inventors: Grant A. Gordon, Peoria, AZ (US); Yates Wong, Humboldt, AZ (US); Richard Bonvouloir, Phoenix, AZ (US); Patrick Flynn, Phoenix, AZ (US); Morris Anderson, Mesa, AZ (US); Allen Brown, Chandler, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/830,943

(22) Filed: Aug. 20, 2015

(65) Prior Publication Data
US 2017/0052046 A1    Feb. 23, 2017

(51) Int. Cl.
*G01F 1/46*    (2006.01)
*B05D 3/00*    (2006.01)

(52) U.S. Cl.
CPC ............... *G01F 1/46* (2013.01); *B05D 3/007* (2013.01); *B05D 2202/00* (2013.01); *B05D 2350/30* (2013.01); *B05D 2451/00* (2013.01)

(58) Field of Classification Search
CPC ..... G01F 1/32; G01F 1/44; G01F 1/46; A63B 53/00; G01C 21/00
USPC ............ 73/861.22, 861.65, 170.02, 182, 180
See application file for complete search history.

(56) References Cited

U.S. PATENT DOCUMENTS

| | | | | |
|---|---|---|---|---|
| 3,400,583 A | * | 9/1968 | Newport | G01P 5/165 73/182 |
| 3,535,930 A | | 10/1970 | Rees | |
| 3,646,811 A | * | 3/1972 | DeLeo | G01P 5/14 73/182 |
| 4,378,697 A | * | 4/1983 | DeLeo | G01P 5/165 73/182 |

(Continued)

FOREIGN PATENT DOCUMENTS

| | | |
|---|---|---|
| FR | 1439443 | 5/1966 |
| FR | 1472440 | 3/1967 |

(Continued)

OTHER PUBLICATIONS

European Patent Office, "Extended European Search Report from EP Application No. 16184411.3 mailed Dec. 20, 2016", "from Foreign Counterpart of U.S. Appl. No. 14/830,943", Dec. 20, 2016, pp. 18, Published in: EP.

*Primary Examiner* — Jewel V Thompson
(74) *Attorney, Agent, or Firm* — Fogg & Powers LLC (57) ABSTRACT

Systems and methods for additive manufacturing for air data probes are provided. In at least one embodiment a probe comprises a support structure comprising one or more ports for receiving one or more fluids, the support structure comprising an endoskeleton mandrel having an opening for receiving a fluid; and a heating cable encircling an external surface of the endoskeleton mandrel. The probe also comprises an additive coating fused to the external surface of the endoskeleton mandrel and an external surface of the heating cable; and an internal assembly inside the support structure for carrying pressures from the one or more ports to one or more instruments that respond to the one or more fluids to provide a measurement.

11 Claims, 5 Drawing Sheets

(56) References Cited

U.S. PATENT DOCUMENTS

| | | | | |
|---|---|---|---|---|
| 4,836,019 A | * | 6/1989 | Hagen | G01P 13/025 |
| | | | | 73/180 |
| 5,046,360 A | * | 9/1991 | Hedberg | G01F 1/46 |
| | | | | 73/182 |
| 5,442,958 A | * | 8/1995 | Hagen | G01P 13/02 |
| | | | | 73/170.02 |
| 5,616,861 A | * | 4/1997 | Hagen | G01P 5/14 |
| | | | | 73/170.02 |
| 6,070,475 A | | 6/2000 | Muehlhauser et al. | |
| 6,543,298 B2 | * | 4/2003 | Cronin | B64D 43/02 |
| | | | | 374/E13.006 |
| 6,957,586 B2 | * | 10/2005 | Sprague | G01F 1/3209 |
| | | | | 73/204.21 |

FOREIGN PATENT DOCUMENTS

| | | |
|---|---|---|
| WO | 9205414 | 4/1992 |
| WO | 2014105245 | 7/2014 |
| WO | 2015022527 | 2/2015 |

\* cited by examiner

SYSTEMS AND METHODS FOR ADDITIVE MANUFACTURING FOR AIR DATA PROBES

BACKGROUND

In multiple applications, pitot probes are used to calculate the velocity of a vehicle through a fluid by measuring differences in air pressure. In at least one primary application, the pitot probe functions to gather measurements that are used to determine the velocity of an aircraft. As aircraft travel at high elevations, pitot, pitot static and other air data probes, located on the external surface of the aircraft, are exposed to cold air temperatures in environments that can cause ice to build up on the external surface of the pitot probe. If the ice were permitted to build up, the ice may interfere with fluid flow into an opening in the pitot probe. Accordingly, pitot probes may be heated to prevent the ice from building up on surfaces of the pitot tube. In at least one implementation, a heating coil may be placed around the external surface of the pitot probe. Frequently, the heating coil is joined to the pitot tube through brazing. However, due to challenges associated with the brazing process, the braze filler may be irregularly applied. An irregularly applied braze is generally identifiable during manufacturing and leads to further costs to correctly apply the braze such that the heater coil is able to appropriately conduct heat to the pitot probe.

SUMMARY

Systems and methods for additive manufacturing for air data probes are provided. In at least one embodiment a probe comprises a support structure comprising one or more ports for receiving one or more fluids, the support structure comprising an endoskeleton mandrel having an opening for receiving a fluid; and a heating cable encircling an external surface of the endoskeleton mandrel. The probe also comprises an additive coating fused to the external surface of the endoskeleton mandrel and an external surface of the heating cable; and an internal assembly inside the support structure for carrying pressures from the one or more ports to one or more instruments that respond to the one or more fluids to provide a measurement.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described within the present disclosure provide systems and methods for using additive manufacturing when fabricating a pitot tube. In particular, a body of a pitot tube may be fabricated around an endoskeleton mandrel of a pitot tube through the use of additive manufacturing. The additive manufacturing may be performed using a directed energy deposition method to melt material provided in a powder or wire form using a laser, electron beam or plasma arc energy source. The additive manufacturing may also be performed by a a cold spray process. Unlike directed energy deposition methods that use heat to fuse materials together, Cold Spray is an additive manufacturing process that accelerates metal powder to supersonic speeds to add this material to a substrate. The use of the additive manufacturing builds up layers of thermally conductive material that encapsulates a coaxial cable heater wrapped around the mandrel. Due to the nature of the additive manufacturing, the mandrel becomes part of the probe body and the encapsulated heater cable is able to effectively couple heat to the probe body. By using the additive manufacturing methods, the material that is added to the pitot probe is more effectively controlled, when compared to the addition of material through a brazing process. Thus, the cost of manufacturing using additive manufacturing techniques reduces manufacturing time and improves product yield, which are both benefits that reduce the overall manufacture cost.

Figure 1:
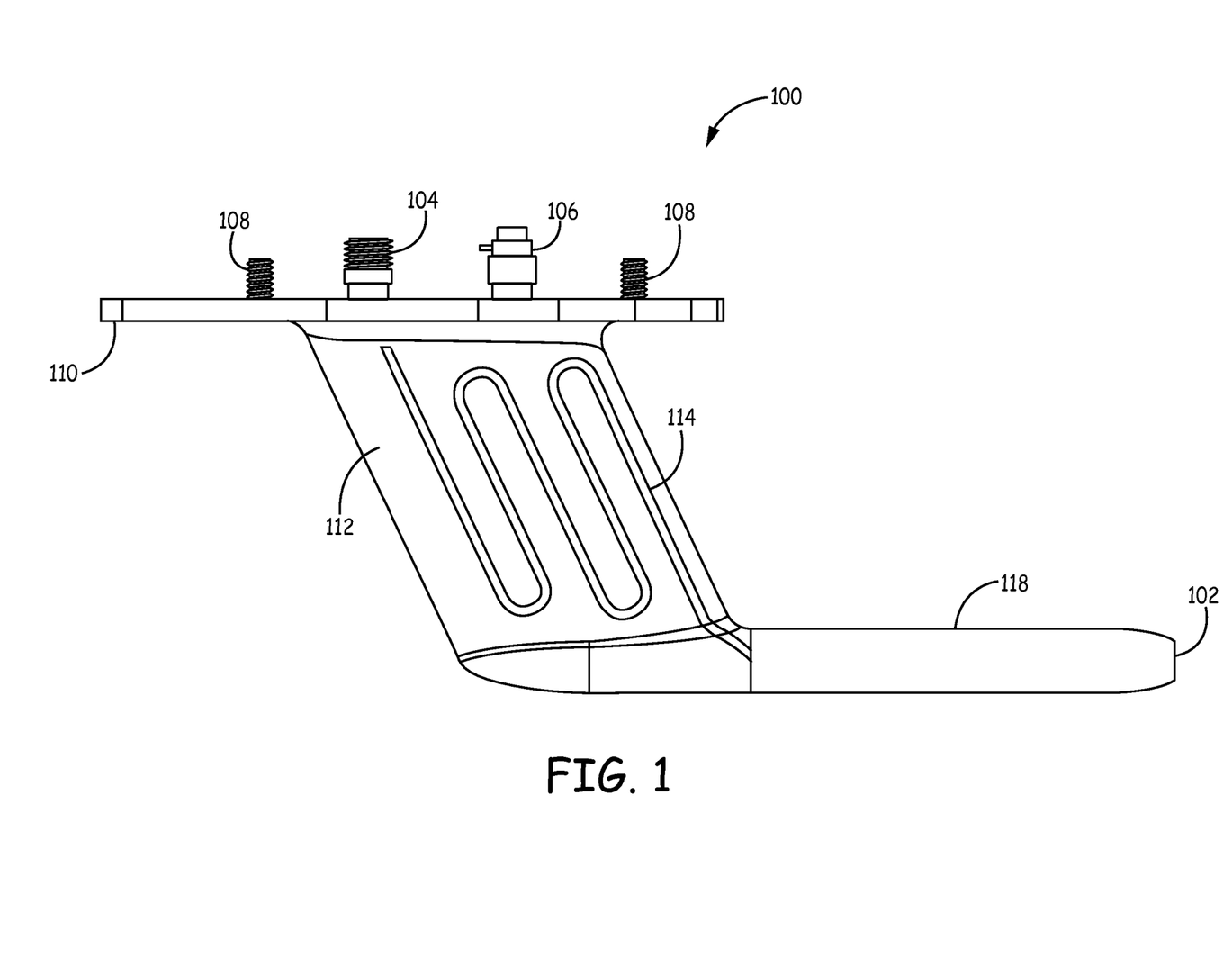
FIG. 1 is a side view of a pitot probe according to one embodiment described in the present disclosure.

FIG. 1 is a cross section view of a pitot probe 100 that is manufactured using an additive manufacturing process. The pitot probe, also known as a pitot tube, is well known instrument that is in the measurement of fluid flow velocity. For example, in one particular implementation, a pitot probe is used to facilitate the determination of the airspeed of an aircraft. To determine, the fluid flow velocity, a tube is placed into a fluid such that an inlet 102 of the probe 100 points directly into the flowing fluid. As known to one having skill in the art, the pitot tube delivers pressure pneumatically to a pressure sensor that measures the pressure due to the flowing fluid entering through the inlet 102. Electrical power to drive the Pitot heater is delivered through a connector 104 to one or more instruments that provide electrical signals based on the pressure that is sensed through the pneumatic port 106. The acquisition of pressure information from the pitot tube 100 is known to one having skill in the art. Further, the pitot tube 100 may attach to a vehicle through fasteners 108 that secure a flange 110 to an aircraft body. Further, a strut 112 connects the tube portion of the pitot probe 100 to the flange 110, the tube and the strut 112 may also considered as a single support structure for the inlet 102 of the pitot probe 100. Other attaching devices for positioning the inlet 102 in a flowing fluid while attaching the pitot probe 100 to a vehicle are also considered.

As the pitot probe 100 may be connected to an aircraft that travels at high elevations, the pitot probe 100 may be exposed to freezing air temperatures. The exposure to freezing air temperatures may cause ice to build up on the surface of the aircraft, including on the exposed surfaces of the pitot probe 100, which is attached to the surface of the aircraft. The buildup of ice on the pitot probe 100 has the potential to affect the pressure that develops within the tube portion of the pitot probe 100. In particular, ice may inhibit the flow of fluid into the inlet 102 of the probe, which subsequently affects the pressure within the tube. To prevent ice buildup on the surfaces of the pitot probe 100, a heating cable 114 may be placed within the body of the pitot probe 100. In certain implementations, to place the heating cable 114 within the body of the pitot probe 100, the heating cable 114 is wrapped around portions of a mandrel (the mandrel being better illustrated in subsequent FIGS. 2A-2C, 3, and 4 and described below) of the pitot tube and then additive material is added to the surface of the pitot tube mandrel and the heating cable 114 to build up an additive coating 118 around the heating cable 114 that is fused to the mandrel, such that heat produced by the heating cable 114 is evenly radiated throughout the pitot probe 100, in particular the heat is evenly distributed around the tube portion of the pitot probe 100 such that the stagnation pressure that develops within the pitot probe due to air that enters through the inlet 102 can be used to provide a reasonably accurate determination of the air velocity of the attached aircraft. In at least one other implementation, the additive coating 118 is built up around the support structure that includes both the strut 112 and the mandrel.

Figure 2A:
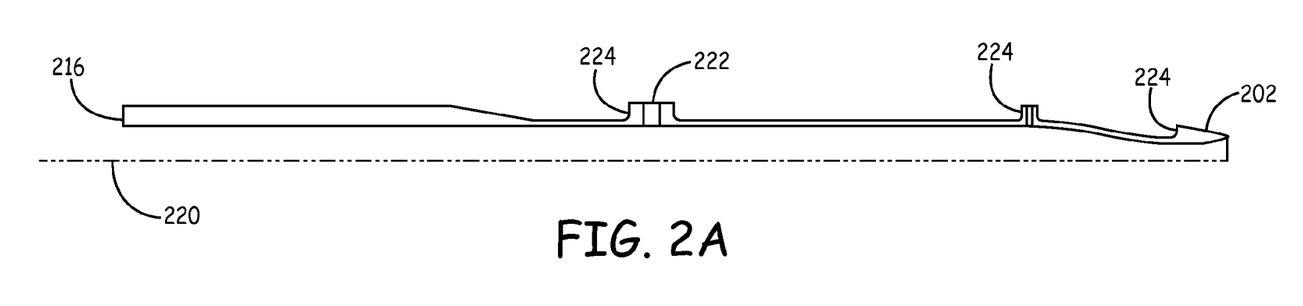
FIG. 2A-2C are a series of cross section views that illustrate additive manufacturing for a pitot probe according to at least one embodiment described in the present disclosure.
Figure 2B:
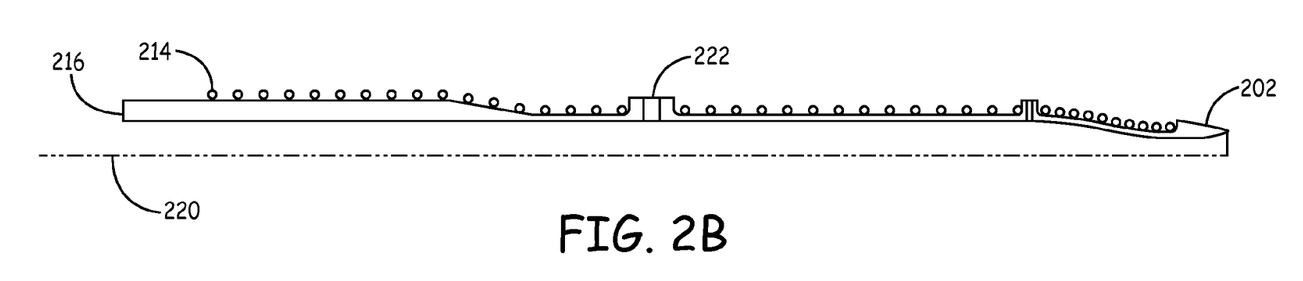
Figure 2C:
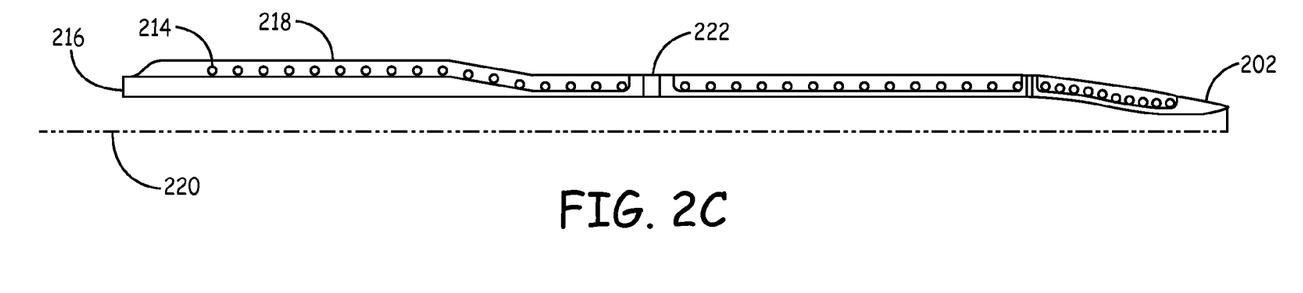

FIGS. 2A-2C illustrate cross section views of a pitot static probe at different stages of fabrication, where the additive coating is fabricated using an additive manufacturing process. FIG. 2A illustrates a portion of an internal mandrel 216 after the internal mandrel 216 has been formed. The internal mandrel 216 as illustrated represents a cross section of one side of the internal mandrel 216. In certain implementations, the complete mandrel 216 may be represented by rotating the cross section about the axis 220. As illustrated, in certain embodiments, the mandrel may have one or more channels 222 through the mandrel. The channels 222 allow air to enter the pitot tube for the measurement of the static pressure, which can be used with measurements of the total pressure acquired by fluid that enters through the inlet 202. As the formation of ice on the mandrel can potentially interfere with the pressure measurements, the mandrel 216 may be formed in such a way to facilitate the heating of the mandrel 216 using a heating cable 214.

Figure 3A:
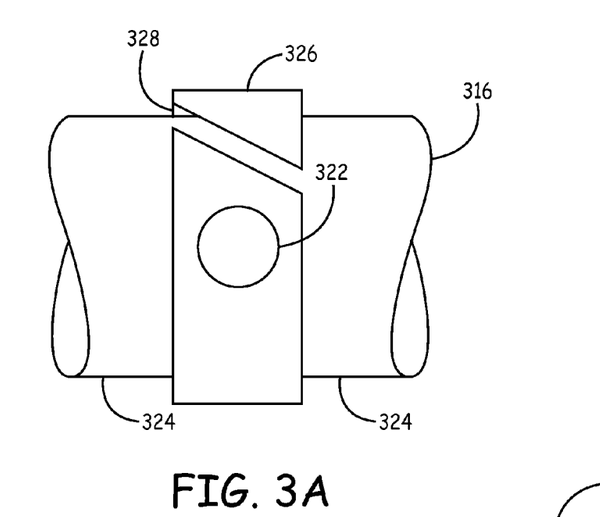
FIGS. 3A-3B illustrate different implementations for fabricating a channel through a pitot probe according to at least one embodiment described in the present disclosure.
Figure 3B:
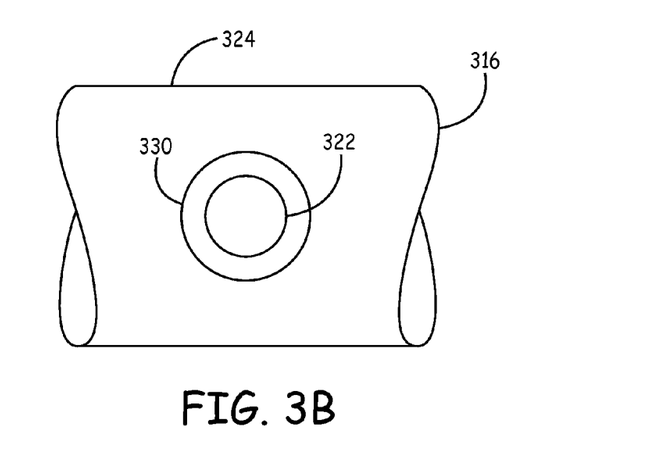

FIG. 2B illustrates a cross section view of a portion of the mandrel 216 having a heating cable 214 wrapped around the mandrel 216. As illustrated, in one implementation, the mandrel 216 is formed having a recessed portion 224. The recessed portion 224 is used to facilitate the placement of the heating cable 214 and subsequent buildup of the additive coating 218 through additive processing as shown in FIG. 2C. In certain implementations, the heating cable 214 may be a coaxial cable heater that is wound around the mandrel 216 within the recessed portion 224. In one particular example, illustrated in FIGS. 2A-2B, there appears to be three separate recessed portions 224. The three separate recessed portions 224 may be either separate recessed portions or may be part of a single contiguous recessed portion. For example, the recessed portions may be separated from one another by rings of extended mandrel material that wrap around the mandrel 216 where the channels 222 exist, where a groove extends through the ring to allow the heating cable 214 to pass from one recessed portion to the next. Alternatively, the recessed portions are contiguous as the channels are only immediately surrounded by a pillar of material that extends away from the mandrel 216. FIGS. 3A and 3B illustrate different implementations for the channel through the mandrel 216. In at least one implementation, after the heating cable 214 is wrapped around the mandrel 216, the heating cable 214 may be tack welded in place to prevent the heating cable 214 from moving during subsequent processing.

FIG. 3A illustrates a view of a portion of a mandrel 316 having a channel ring 326 that extends around the circumference of the mandrel 316. Within the channel ring 326, a channel 322 extends from the exterior surface of the mandrel 316 to the interior of the mandrel 316. On both sides of the channel ring 326, recessed portions 324 are formed on the mandrel 316. The recessed portions 324 permit the winding of a heating cable, such as heating cable 214, around the mandrel 316. As the heating cable is wound from one end of the mandrel 316 to the other end of the mandrel 316, the heating cable passes through a groove 328 in the channel ring 326. Grooves, such as groove 328, allow a single heating cable to be wound around the mandrel 316 across the length of the mandrel 316 through multiple recessed portions 324.

In contrast to the embodiment described in FIG. 3A, FIG. 3B illustrates a view of a portion of a mandrel 316 having a channel pillar 330 that extends from the surface of the mandrel 316 around a channel 322. The channel 322 extends through the channel pillar 330 from the exterior surface of the mandrel 316 to the interior of the mandrel 316. The recessed portion 324 contiguously extends along the length of the mandrel 316 allowing a single heating cable to wrap around the length of the mandrel 316 within the single contiguous recessed portion.

Figure 4:
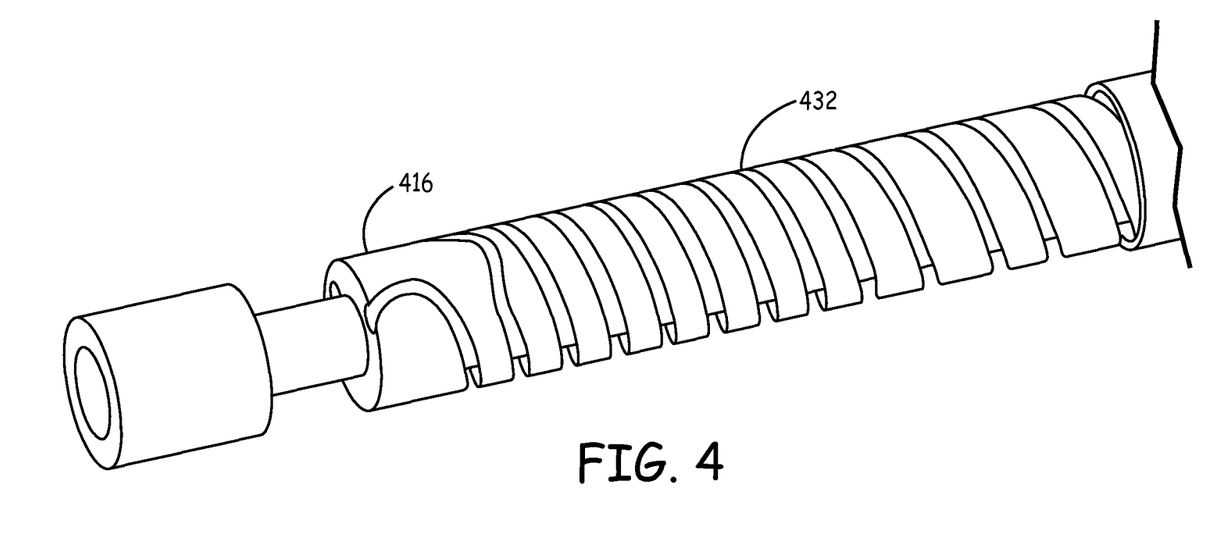
FIG. 4 illustrates an implementation for winding a heating cable around a mandrel for a pitot probe according to at least one embodiment described in the present disclosure.

FIG. 4 illustrates an alternative mandrel 416 that does not have a large recessed portion as described above in relation to FIGS. 2A-2C and 3A-3B. In contrast to the recessed portion, the mandrel 416 has a groove 432 that wraps around the mandrel 416, such that a heating cable can be placed directly in the groove 432 before an additive coating is applied to the groove mandrel 416. The use of a single groove 432 may provide more control over the spacing of the heating cable over the length of the mandrel 416.

Turning to FIG. 2C, in embodiments described herein, after the heating cable 214 is wound around the mandrel 216, an additive coating 218 is added to the exterior of the mandrel 216. In certain implementations, before the additive coating 218 is added, a cooled mandrel support may be fabricated to support the mandrel during the addition of the additive coating 218 to prevent the mandrel from damage from high temperatures and to facilitate the cooling of the additive coating 218. The additive coating 218 is added through a deposition technology such that the additive material fuses to the material used to fabricate the mandrel 216 and surrounds the heating cable 214. The heating cable 214 becomes encapsulated within the body of the pitot probe formed by the fusion of the additive coating 218 to the mandrel 216. Further, the additive coating 218 may fuse to a sheath that surrounds the heating cable 214. In one implementation, the additive coating 218 is built up through a directed energy deposition method that melts material provided in a powder or wire form using a laser, electron beam or plasma arc energy source. In an alternative implementation, the additive coating 218 is built up through a cold spray fusion technology. Further, after the additive coating 218 is built up, the additive coating 218 may be machined into a desired shape.

In implementations where the additive coating 218 is built up through laser powder fusion technology, a metal powder may be fused to the exterior of the heating cable 214 through well controlled heat inputs. For example, a laser beam is used to control a localized molten pool of metal formed on locations on the combination of the heating cable 214 and the exterior of the mandrel 216. A powder feeder feeds metal powder into the molten pool, where the powder is melted and incorporated into the molten pool, where the metal is fused to the exterior of the mandrel 216 and the exterior of the heating cable 214. As a laser beam is used to melt the metal, the process allows for a low heat input and a precise beam delivery that reduces component cracking, distortion, and the area affected by heat. The process may be automated and thus may potentially provide a higher yield than other techniques, such as brazing. Further, the laser powder fusion process allows for a higher deposition rate than other processes and due to the precision of the process, there is also the potential for a reduction in material waste. These factors may allow for an improved production yield and reduction in part costs.

In an alternative implementation, the additive coating 218 may be built up through a cold spray technology process. In the cold spray technology process, feed stock particles are injected into a gas flow. In certain implementations, the particles may be a metal powder, or a powdered combination of both ceramics and metal. The gas flow/feed stock particle combination is then accelerated such that it leaves a nozzle at high velocities. In some exemplary implementations, the nozzle is a supersonic nozzle that constricts the flow of gas such that the gas/particle mixture is ejected at supersonic speeds. The nozzle also aims the particles moving at a high velocity towards a substrate, where the particles impinge on and fuse to the substrate. For example, the particles impinge on the mandrel 216 and the heating cable 214 such that the particles fuse to the external surface of the mandrel 215 and the external sheathing of the heating cable 214. The particles are then built up upon each other to form the additive coating 218. The cold spray process provides benefits due to the low temperature of the process. In particular, there is no phase changes to either the sprayed particles or to the substrate. Also, the low temperature limits oxidation to the particles and the substrate.

Figure 5:
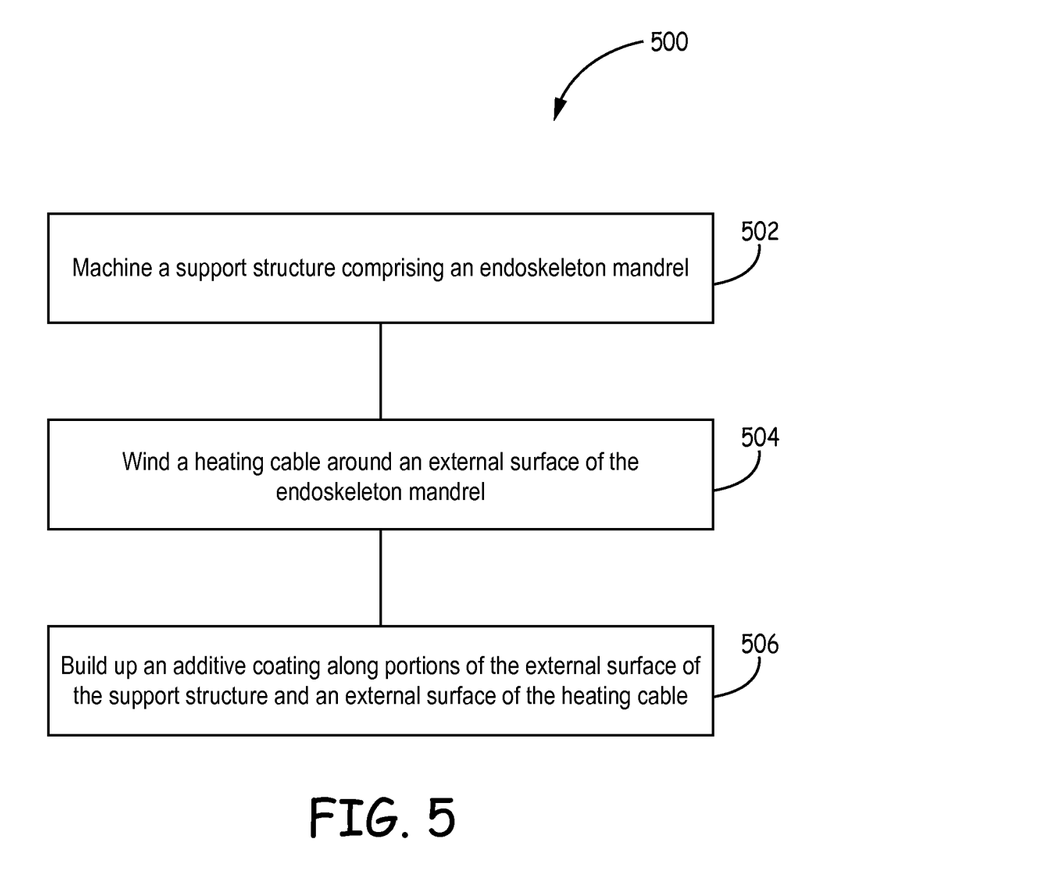
FIG. 5 illustrates a method for using an additive process in the manufacturing of a pitot probe according to at least one embodiment described in the present disclosure.

FIG. 500 illustrates a method 500 for fabricating a pitot probe using an additive manufacturing process. For example, method 500 proceeds at 502, where a support structure comprising an endoskeleton mandrel is machined. In at least one exemplary implementation, when the support structure that includes the endoskeleton mandrel is machined, the mandrel is fabricated to have channels extending from the external surface into the internal surface of the mandrel, such that the static pressure can also be measured. Further, portions of the external surface of the mandrel may be machined to facilitate the winding of a heating cable around the mandrel. For example, one or more sections of the external surface of the mandrel may be recessed to facilitate the winding of the heating cable. In certain implementations, the recessed portions are a single contiguous recessed portion or a groove that winds through the external surface of the mandrel.

Further, method 500 proceeds at 504, where a heating cable is wound around an external surface of the endoskeleton mandrel. In certain implementations, to keep the heating cable in the correct location on the mandrel, the heating cable may be tack welded to the mandrel. Further, a cooled mandrel support may be fabricated to support and cool the mandrel during subsequent processing that may be at elevated temperatures. Method 500 proceeds at 506, where an additive coating is built up along portions of the external surface of the support structure and an external surface of the heating cable. In certain implementations, the additive coating is built up using a directed energy deposition process. Alternatively, the additive coating may be built up using a cold spray technology process. In further implementations, when the additive coating has been added, the additive coating may be machined into a desired shape.

EXAMPLE EMBODIMENTS

Example 1 includes an air data sensing probe, the probe comprising: a support structure comprising one or more ports for receiving one or more fluids, the support structure comprising an endoskeleton mandrel having an opening for receiving a fluid; a heating cable encircling an external surface of the endoskeleton mandrel; an additive coating fused to the external surface of the endoskeleton mandrel and an external surface of the heating cable; and an internal assembly inside the support structure for carrying pressures from the one or more ports to one or more instruments that respond to the one or more fluids to provide a measurement.

Example 2 includes the probe of Example 1, wherein the additive coating is added by at least one of: a directed energy deposition process; and a cold spray technology process.

Example 3 includes the probe of Example 2, wherein the additive coating added through the cold spray technology process is comprised of at least one of: a metal; a layer of one or more metals; and a combination of one or more metals and one or more ceramics.

Example 4 includes the probe of any of Examples 1-3, wherein the endoskeleton mandrel comprises one or more recessed portions on the external surface of the endoskeleton mandrel, wherein the heating cable encircles the endoskeleton mandrel within the one or more recessed portions and the additive coating is added to the endoskeleton mandrel within and/or over the recessed portions.

Example 5 includes the probe of Example 4, wherein the endoskeleton mandrel comprises a channel that extends from the external surface of the endoskeleton mandrel to the interior surface of the endoskeleton mandrel, wherein the channel allows fluid to pass from the external surface of the device to the interior surface of the endoskeleton mandrel.

Example 6 includes the probe of Example 5, wherein a channel ring extends around the external surface of the endoskeleton mandrel, wherein the channel ring separates a first recessed portion in the one or more recessed portions from a second recessed portion in the one or more recessed portions, wherein the heating cable passes from the first recessed portion to the second recessed portion through a groove in the channel ring.

Example 7 includes the probe of any of Examples 5-6, wherein a channel pillar extends from the external surface of the endoskeleton mandrel around the channel, wherein the one or more recessed portions is comprised of a single contiguous recessed portion.

Example 8 includes the probe of any of Examples 1-7, wherein the heating cable wraps around the endoskeleton mandrel through a groove that extends around an external surface of the endoskeleton mandrel.

Example 9 includes a method for fabricating an air data sensing probe, the method comprising: machining a support structure comprising one or more ports for receiving one or more fluids, the support structure comprising an endoskeleton mandrel, the endoskeleton mandrel having an opening for receiving a fluid; winding a heating cable around an external surface of the endoskeleton mandrel in areas along the external surface of the endoskeleton mandrel that are designed to receive the heating cable; and building up of an additive coating along portions of the external surface of the support structure and an external surface of the heating cable, wherein the additive coating is fused to portions of the external surface of the support structure and the external surface of the heating cable.

Example 10 includes the method of Example 9, wherein the building up of the additive coating comprises at least one of: building up the additive coating through a directed energy deposition process; and building up the additive coating through a cold spray technology process.

Example 11 includes the method of Example 10, wherein the additive coating built up through the cold spray technology process is comprised of at least one of: a metal; a layer of one or more metals; and a combination of one or more metals and one or more ceramics.

Example 12 includes the method of any of Examples 9-11, further comprising building a cooled mandrel support, wherein the cooled mandrel support cools the endoskeleton mandrel during the building up of the additive coating.

Example 13 includes the method of any of Examples 9-12, further comprising tack welding a portion of the heating cable to the external surface of the endoskeleton mandrel before the building up of the additive coating.

Example 14 includes the method of any of Examples 9-13, further comprising machining the additive coating into a desired shape.

Example 15 includes the method of any of Examples 9-14, wherein machining the endoskeleton mandrel further comprises forming one or more recessed portions on the external surface of the endoskeleton mandrel, wherein the heating cable is wound around the endoskeleton mandrel within the one or more recessed portions and the additive coating is added to the endoskeleton mandrel within and/or over the recessed portion.

Example 16 includes the method of any of Examples 1-15, wherein machining the endoskeleton mandrel comprises forming a channel that extends from the external surface of the endoskeleton mandrel to the interior surface of the endoskeleton mandrel.

Example 17 includes the method of any of Examples 9-16, wherein winding the heating cable around the external surface of the endoskeleton mandrel comprises winding the heating cable within a groove that extends around an external surface of the endoskeleton mandrel.

Example 18 includes an apparatus for providing air data sensing, the apparatus comprising: a support structure comprising one or more ports for receiving one or more fluids, wherein the support structure comprises a tube having an inlet on a first end of the tube, wherein the inlet is a port in the one or more ports; an attaching device for mounting the support structure to a vehicle; a heating cable that extends from the attaching device through the support structure and wraps around the tube, wherein the heating cable is encapsulated within additive material that is fused to an external surface of the heating cable and a portion of an external surface of the support structure; and an internal assembly inside the attaching device for carrying pressures of the one or more fluids to one or more instruments that respond to the one or more fluids to provide a measurement.

Example 19 includes the apparatus of Example 18, wherein the additive coating is added by at least one of: a directed energy deposition process; and a cold spray technology process.

Example 20 includes the apparatus of any of Examples 18-19, wherein the endoskeleton mandrel comprises one or more recessed portions on the external surface of the endoskeleton mandrel, wherein the heating cable encircles the endoskeleton mandrel within the one or more recessed portions and the additive coating is fused to the endoskeleton mandrel within and/or over the one or more recessed portions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:
1. A probe, the probe comprising:
  a support structure comprising one or more ports for receiving one or more fluids, the support structure comprising an endoskeleton mandrel having an opening for receiving a fluid;
  a heating cable encircling an external surface of the endoskeleton mandrel;
  an additive coating fused to the external surface of the endoskeleton mandrel and an external surface of the heating cable; and
  an internal assembly inside the support structure for carrying pressures from the one or more ports to one or more instruments that respond to the one or more fluids to provide a measurement.

2. The probe of claim 1, wherein the additive coating is added by at least one of:
  a directed energy deposition process; and
  a cold spray technology process.

3. The probe of claim 2, wherein the additive coating added through the cold spray technology process is comprised of at least one of:
  a metal;
  a layer of one or more metals; and
  a combination of one or more metals and one or more ceramics.

4. The probe of claim 1, wherein the endoskeleton mandrel comprises one or more recessed portions on the external surface of the endoskeleton mandrel, wherein the heating cable encircles the endoskeleton mandrel within the one or more recessed portions and the additive coating is added to the endoskeleton mandrel within and/or over the recessed portions.

5. The probe of claim 4, wherein the endoskeleton mandrel comprises a channel that extends from the external surface of the endoskeleton mandrel to the interior surface of the endoskeleton mandrel, wherein the channel allows fluid to pass from the external surface of the device to the interior surface of the endoskeleton mandrel.

6. The probe of claim 5, wherein a channel ring extends around the external surface of the endoskeleton mandrel, wherein the channel ring separates a first recessed portion in the one or more recessed portions from a second recessed portion in the one or more recessed portions, wherein the heating cable passes from the first recessed portion to the second recessed portion through a groove in the channel ring.

7. The probe of claim 5, wherein a channel pillar extends from the external surface of the endoskeleton mandrel around the channel, wherein the one or more recessed portions is comprised of a single contiguous recessed portion.

8. The probe of claim 1, wherein the heating cable wraps around the endoskeleton mandrel through a groove that extends around an external surface of the endoskeleton mandrel.

9. An apparatus for providing air data sensing, the apparatus comprising:
- a support structure comprising one or more ports for receiving one or more fluids, wherein the support structure comprises a tube having an inlet on a first end of the tube, wherein the inlet is a port in the one or more ports;
- an attaching device for mounting the support structure to a vehicle;
- a heating cable that extends from the attaching device through the support structure and wraps around the tube, wherein the heating cable is encapsulated within additive material that is fused to an external surface of the heating cable and a portion of an external surface of the support structure; and
- an internal assembly inside the attaching device for carrying pressures of the one or more fluids to one or more instruments that respond to the one or more fluids to provide a measurement.

10. The apparatus of claim 9, wherein the additive coating is added by at least one of:
- a directed energy deposition process; and
- a cold spray technology process.

11. The apparatus of claim 9, wherein the endoskeleton mandrel comprises one or more recessed portions on the external surface of the endoskeleton mandrel, wherein the heating cable encircles the endoskeleton mandrel within the one or more recessed portions and the additive coating is fused to the endoskeleton mandrel within and/or over the one or more recessed portions.

* * * * *